April 21, 1953     P. R. SCHROEPPEL     2,635,412
SIDE-DELIVERY RAKE

Filed Oct. 4, 1946     4 Sheets—Sheet 1

Inventor:
Paul R. Schroeppel.
By Soans Pond Anderson
Attorneys.

April 21, 1953 P. R. SCHROEPPEL 2,635,412
SIDE-DELIVERY RAKE

Filed Oct. 4, 1946 4 Sheets-Sheet 4

Fig.4

Inventor:
Paul R. Schroeppel,
By Soans, Pond & Anderson
Attorneys.

Patented Apr. 21, 1953

2,635,412

UNITED STATES PATENT OFFICE 2,635,412

SIDE-DELIVERY RAKE

Paul R. Schroeppel, Rockford, Ill., assignor to J. I. Case Company, Racine, Wis., a corporation of Wisconsin Application October 4, 1946, Serial No. 701,147

12 Claims. (Cl. 56—377)

1

The main objects of this invention are, to provide an improved form of a yielding mounting for the reel of a side-delivery rake which permits the reel to automatically accommodate its position to the irregularities of the terrain over which it is required to travel; to provide an improved mounting of this kind which requires a minimum movement of the reel in its accommodation to terrain irregularities; to provide an improved means for a reel mounting of this kind whereby the reel may be conveniently and completely retracted from its operative position for transport purposes; to provide an improved construction of the reel in a rake of this kind to permit its effective rotation at speeds materially less than has seemed to be possible with reels as heretofore constructed; to provide an improved means for adjusting and maintaining the pitch angle of the reel tines to the terrain; and to provide an improved side-delivery rake of this kind which is simple and economical to manufacture and which is more durable and efficient than prior constructions have proven to be.

A side-delivery rake embodying the preferred form of this invention is shown in the accompanying drawings, wherein:

Fig. 4 is an enlarged end view of the opposite end of the reel, taken on the line 4—4 of Fig. 2, showing the reel-suspension means and the tine-rod positioning means;

Fig. 4A is an enlarged, fragmentary detail of one of the bearings for the rotating reel;

Fig. 4B is an enlarged fragmentary detail in side elevation of the bearings shown in Fig. 4A, illustrating its connection to the reel-supporting frame whereby it may be adjusted for altering the pitch of the lines to the terrain.

Figure 1:
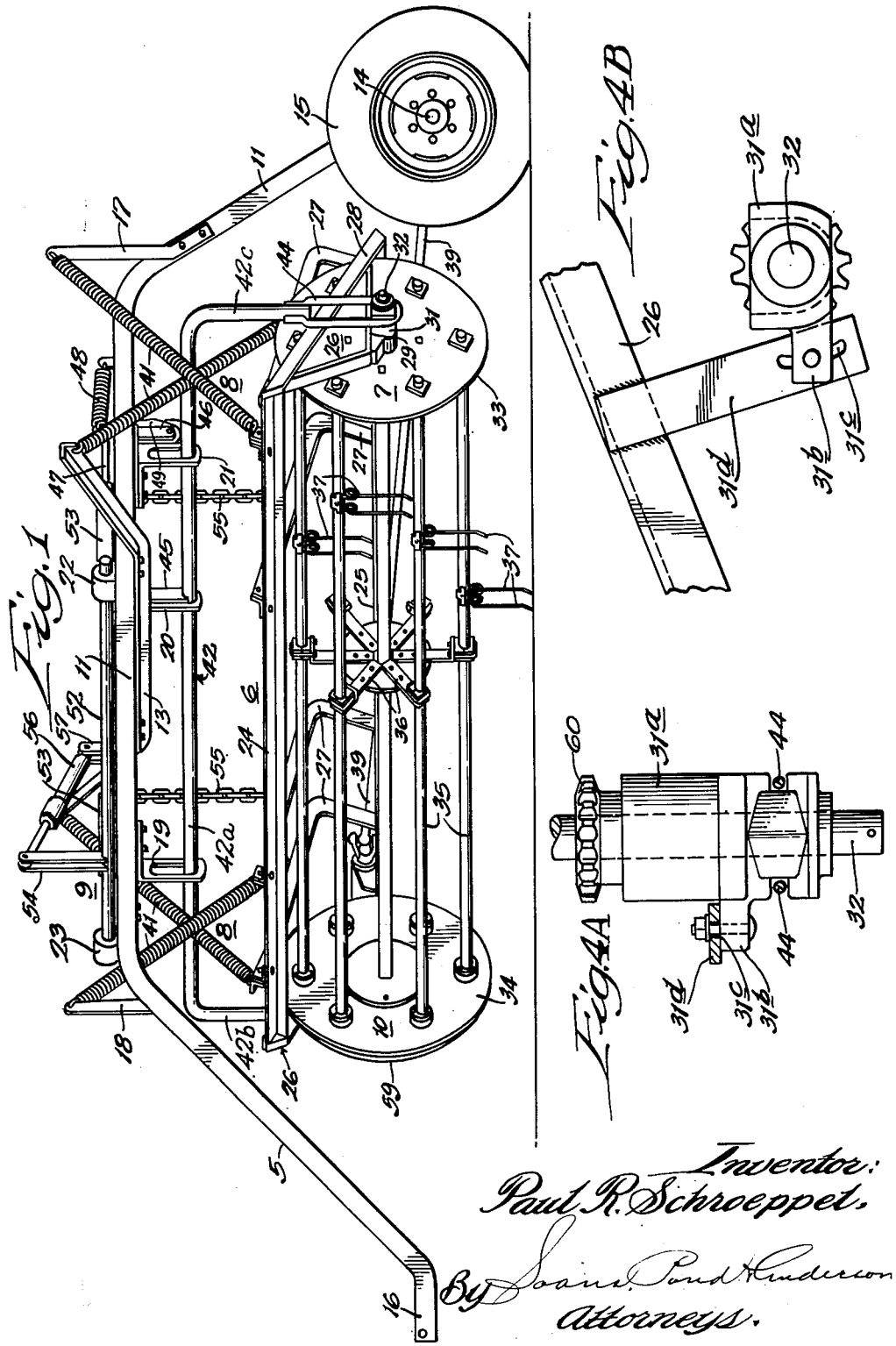
Fig. 1 is a side elevation thereof.

The preferred form of side-delivery rake embodying this invention comprises a main frame 5 from which is suspended a reel-supporting frame 6, with its rotating reel 7, by a suspension means 8 and elevating means 9. The reel 7 is equipped with a tine-rod positioning means 10.

As herein shown, the main frame 5 comprises

2 a pair of lateral angle bars 11 and 12, a transverse angle bar 13, and a transverse brace 50. The bars 11 and 12 are supported at their rear ends on an axle 14 whereon is mounted the usual wheels 15, and arched intermediately upward between the axle 14 and the forward ends of said bars which are brought together in the form of a Y 16, with the extreme end thereon approximately on the same level as the axle 14 and adapted to have the usual connection made thereto for attachment of the rake to a tractor or other draft means. The transverse bar 13 is arranged a bit off from a right angle to the bars 11 and 12. The outer ends of the bar 13, beyond the respective bars 11 and 12, extend upwardly. Upwardly-extending brackets 17 and 18 are secured adjacent the rear and front ends of the bars 11 and 12, respectively, to co-act with the upwardly-extending ends of the cross bar 13 for support of the springs of the reel-frame-suspension means 8.

On the under side of the main frame 5 are secured three slotted brackets 19, 20, and 21, which provide support for part of the suspension means 8, and on the upper side of said frame are arranged a pair of brackets 22 and 23 which provide bearings for the elevating means 9 for the reel-supporting frame 6.

The reel-supporting frame 6 as herein shown is of rectangular form comprising, a pair of side members 24 and 25, a pair of end supports 26, and transverse reinforcing bars 27. The side bars 24 and 25 are preferably angle bars and are welded or otherwise secured at their ends to the end supports 26. As most clearly shown in Fig. 1, the end supports 26 are of triangular form. Each comprises a straight bar 28 and an angle-shaped bar 29. On the latter is mounted journal bearings 31 and 31a for the shaft 32 of the reel 7.

The reel 7 as shown comprises a pair of disc-shaped end members 33 and 34 secured to the shaft 32 and spanned by a number of tine-rods 35, braced by a spider 36 intermediate the end members 33 and 34. The tine-rods 35 have attached thereto the required number of tines 37 which, during the rotation of the reel 7, are maintained in vertical positions through the action of the tine-rod positioning-means 10, as will appear more fully hereinafter.

The reel 7 is revolved in the frame 6 by means of sprocket-and-gear mechanism 38 connected to the shaft 14 by a universally-jointed shaft 39 and beveled gears 40. Conventional spring-and-pawl means are arranged in each wheel 15 to ensure proper accelerated speed of each wheel on the respective turns.

The suspension means 8 comprises two pairs of crossed springs 41 and a bail member 42 with the latter of which is associated a reel-positioning means 43. The bail member 42 consists of an intermediate portion 42a and depending end portions 42b and 42c.

The suspension springs 41, as will very clearly appear from the drawings, are crossed and have the upper ends of one pair attached respectively to the right hand end of the cross bar 13 (Fig. 2) and the adjacent bracket 17 and the upper ends of the other pair attached to the opposite ends of the cross bar 13 and the adjacent bracket 18. The lower ends of each pair of springs 8 are connected at spaced points to the end reinforcing bars 27 of the reel-supporting frame 6. The springs are of such a construction that, under normal conditions, and to the extent permitted by the bail 42, they will yieldingly support the reel frame 6 so that the ends of the tines 37 on the lowermost tine-rod 35 will barely contact the ground as the rake travels forward.

The bail 42 is suspended from the main frame 5 on the bearings or slotted brackets 19, 20, and 21 so that the bail is swingable about a generally horizontal axis and vertically movable in the slotted portions of the brackets relative to the main frame. At each end is a saddle or loop 44 which slidably support the journal bearings 31 and 31a for the reel shaft 32. As will appear from Figs. 4A and 4B, the bearings 31 and 31a are slotted to receive the saddle or loop 44. The opposed faces of the slotted portions are divergently inclined upwardly. The bearings therefore are permitted a floating or lost motion movement in the saddles 44. In the event that the tines contact terrain of uneven contour these divergently inclined faces of the bearings permit the elevation of one end of the reel with no danger of the bearing at the other end binding in its bail, saddle, or loop. The contact of the tines 37 with uneven terrain also may cause the reel 7 and its supporting frame 6 to swing rearwardly against the action of the reel-positioning means 43 as well as being permitted a slight elevation relative to the bail 42.

The reel-positioning means 43 comprises a pair of arms 45 and 46 connected by a rod 47 and a spring 48. The arm 45 is welded or otherwise secured to the bail 42 adjacent the bracket 20 (see Figs. 1 and 3). The arm 46 is pivotally mounted on a lug 49 depending from the brace 50. The spring 48 is connected to the upper end of the arm 46 and to a lug 51 on the brace 50. The spring 48 thus acts to shift the bail 42 to hold the reel 7 in a vertical position perpendicular to the terrain, except as the tines 37 may be brought into contact with uneven terrain and counter the action of the spring 48.

The reel-elevating mechanism 9 comprises, a rocker shaft 52 mounted in bearing brackets 22 and 23 and having the angularly-disposed arms 53 and 54 thereon respectively connected to the reel-supporting frame 6, by means of chains 55, and to a lifting jack 56. The chains 55, at their lower ends, are attached to the intermediate reinforcing bars 27 of the reel-supporting frame 6. The piston stem of the jack 56 is connected to the vertically-disposed arm 54 on the rocker shaft 52 and the cylinder is connected to a post 57 on the main frame member 12. By means of a hose 58 the jack 56 is connected to a valve-controlled hydraulic press, of well-known construction, whereby the lifting mechanism 9 may be operated from the operator's seat on the tractor or other draft means.

The tine-rod positioning-means 10 is mounted on the head 34 of the reel 7 protectively within a cap 59 secured to said head 34. This means comprises a sprocket gear 60 and a series of sprocket gears 61, 61', and 61'', connected by a sprocket chain 62. The gear 60 is integral with the journal bearing 31a on which the shaft 32 of the reel 7 is supported. The sprocket gears 61 are secured one on each of the tine-rods 35 intermediate the head 34 and the protective cap 59. The sprocket chain 62 extends around these sprocket gears 60, 61, 61', and 61'', and idlers 63, 63' and 63'', whereby, during the rotation of the reel 7 under the action of the chain-and-sprocket mechanism 38, the tine-rods 35 are rotated relatively of the head 34 (clockwise Fig. 4) so as to keep the tines 37 always parallel and to maintain the pitch of the tines relative to the terrain constant during operation. This is accomplished by passing the chain 62 around the sprocket gear 61' and under the idler 63'. The chain 62 is then trained across the upper portion of the fixedly positioned sprocket gear 60 and under the idler 63'' (Fig. 4). After leaving the idler 63'', the chain 62 engages the sprocket gear 61' and then engages the reeling sprocket gears 61 and the idlers 63, as is shown in Fig. 4. The idler 63' is adjustable on the head 34 so that the slack in the sprocket chain 62 may be properly adjusted.

The bearing 31a has a lug 31b formed thereon on which is mounted a bolt 31c which in turn is received in an arcuate slot in an arm 31d depending from the end support 26 of the reel-supporting element 6. This permits an angular adjustment of the tines 37 so that the pitch thereof to the ground may be slightly adjusted.

The operation of the side-delivery rake herein shown is so apparent from the foregoing description as to require little specific explanation.

Figure 2:
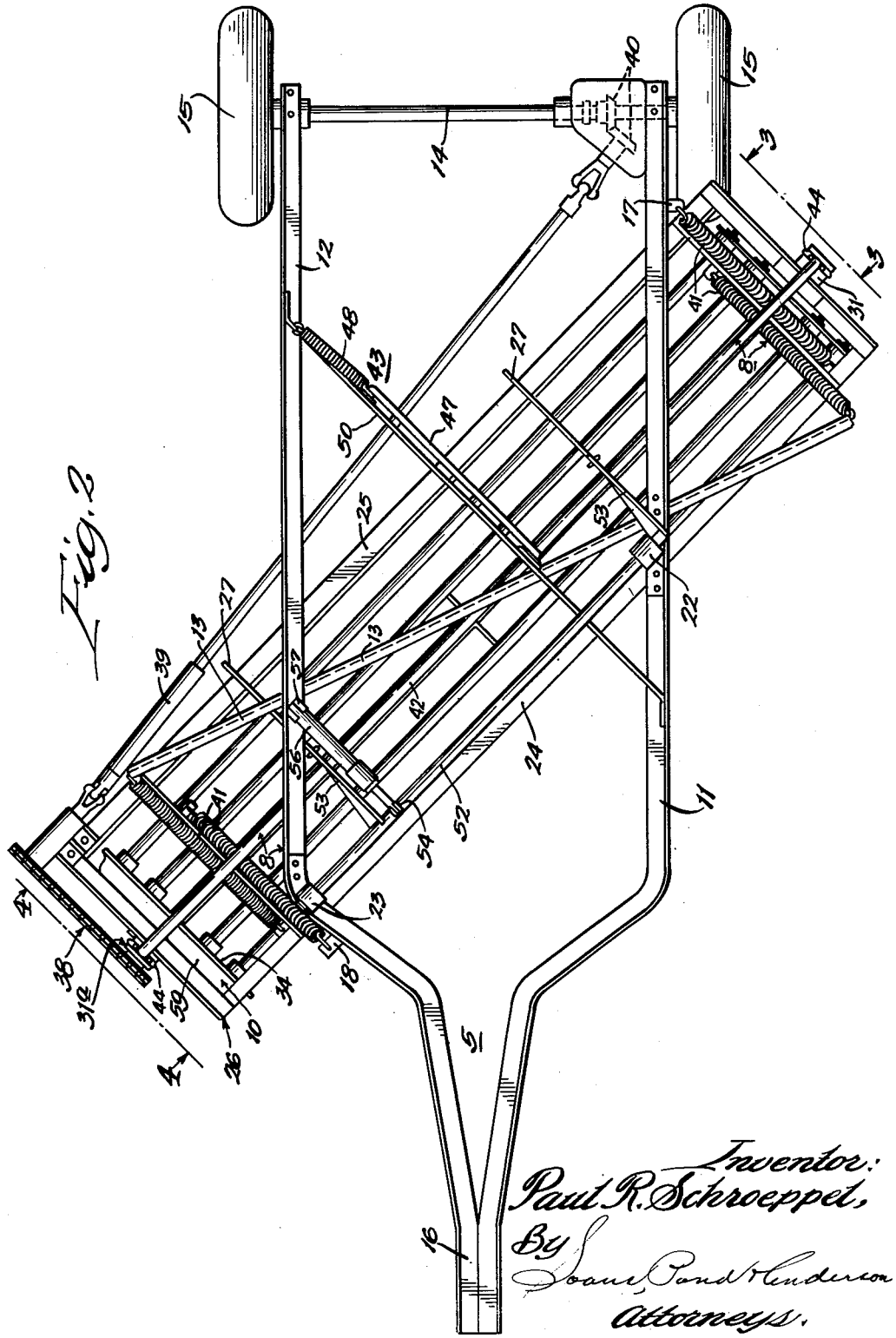
Fig. 2 is a plan view.

As the device is drawn across the field the rotation of the axle 14 in the direction of the arrow in Fig. 2, causes a rotation of the reel 7 through the instrumentality of the beveled gears 40, the universally-jointed shaft 39, and the gear-and-sprocket mechanism 39. The direction of rotation of the reel 7 is clockwise (Fig. 1). The tines 37 thus move down toward, along, and then upwardly away from the ground. In so doing they gather up and push forward the mown material, tending to form it into a roll. Because of the angularity of the reel 7 to the line of travel, this roll tends to move axially along the reel transversely of the main frame 5 and be discharged at the inner or trailing end of the reel 7.

The supporting frame 6 for the reel 7 is suspended on the cross springs 41 the extension of which is limited by the contact of the bearings 31 and 31a against the bottom of the saddles 44 of the bail 42. This positions the ends of the tines 37 so that they barely contact with the ground. If, in its movement along the ground, the reel is confronted with an uneven terrain, as for example mounds or elevations, the tines 37, upon striking these elevations, will tend to either swing the reel 7 and its supporting frame 6 rearwardly or elevate them slightly relative to the bail 42, or both. Any such rearward movement of the reel 7 and its supporting frame 6 will be yieldingly resisted by the spring 48 which, acting through the arms 45 and 46 and the rod 47, tends to hold the reel 7 in its forwardmost position. Obviously any tendency on the part of the reel and frame to move upwardly on the bail 42 will be resisted by the force of gravity, and as soon as the obstruction is passed over the reel and frame will settle to their normal position.

If at any time the more effective operation of the rake requires a change in the pitch of the tines 37 to the terrain this can be made by adjusting the angularity of the lug 31b with regard to the arm 31d.

When the device is being transported on the highway from field to field, obviously it is desirable to have the reel 7 so retracted that there is no danger of the tines coming in contact with the surface over which the transportation of the vehicle takes place. To that end, the jack 56 may be actuated through the operation of the well-known valve-controlled hydraulic means. Such actuation of the jack 56 will rock the shaft 52 so as to swing the arms 53 and, through their connection by means of the chains 55 to the reel-supporting frame 6, elevate the frame 6 and reel 7. The bearings 31 will move to the upper end of the bail saddles 44 and the bail 42 will be moved up to the upper limits of the slots in the brackets 19, 20, and 21. In this way the reel is so fully retracted from its operative position that there is no danger of contact of the tines 37 with the ground or highway during the transport of the device.

Figure 3:
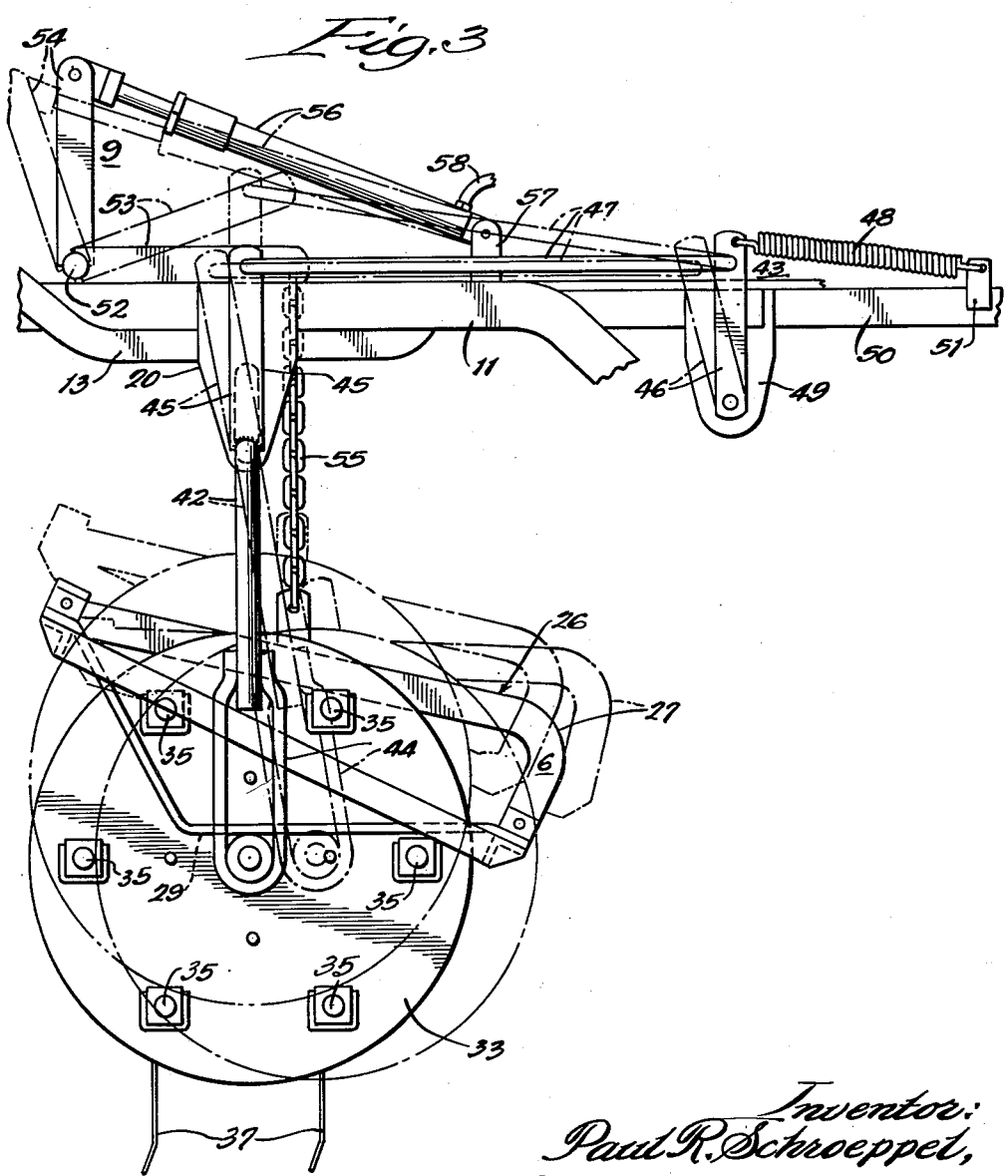
Fig. 3 is an enlarged end view of the reel and some of its related mechanism taken on the line 3—3 of Fig. 2, the reel and its associated position - retaining and reel - frame - retracting means being shown in varied outline forms in their (a) normal operative positions, (b) in their "kick-back" positions, and (c) in their retracted or "lifted" positions.

The normal operative position of the reel 7, its rearward "kick-back" position, and its retracted position or "lifted" position for transport are all shown in Fig. 3 by the respectively different outlines. The solid lines indicate the normal operative position. The line broken with a single dash is the "kick-back" position. The line broken with a double dash is the "lifted" position.

Variations and modifications in the details of structure and arrangement of the parts may be resorted to within the spirit and coverage of the appended claims.

I claim:

1. In a side-delivery rake, the combination of a main frame, a reel-supporting frame, a reel journaled on said reel-supporting frame, and a pair of crossed tension springs attached at their lower ends to spaced points adjacent each end of said reel-supporting frame and attached at their upper ends to said main frame for suspending said reel-supporting frame from said main frame for vertical movement and for fore and aft swinging movement relative to said main frame.

2. In a side-delivery rake, the combination of a main frame comprising a pair of lateral arched members in association with a transverse member the ends of which extend beyond and upwardly from the respective lateral members, a reel-supporting frame, a reel journaled on said reel-supporting frame, and pairs of crossed tension springs one of each pair of which has its upper end attached to the respective end of said transverse member and the other of which has its upper end attached to the adjacent lateral frame member, the lower ends of the springs of each pair being attached at spaced points to said reel-supporting frame adjacent the respective ends thereof, whereby said reel-supporting frame and reel are yieldingly suspended below said arched main frame members.

3. In a side-delivery rake, the combination of a main frame, a reel-supporting frame disposed transversely of said main frame, a reel journaled on said reel-supporting frame, yielding means suspending said reel-supporting frame from said main frame, a bail swingably supported on said main frame and having the ends of said bail slidably supporting said reel, an arm secured to said bail, and yielding means interposed between said arm and said main frame and normally urging said bail to hold said reel in its normal operative position.

4. In a side-delivery rake, the combination of a main frame, a reel-supporting frame disposed transversely of said main frame, a reel journaled on said reel-supporting frame, yielding means suspending said reel-supporting frame from said main frame, slotted brackets attached to said main frame, a bail swingably supported on said slotted brackets whereby said bail may be moved vertically relative to said frame, the ends of said reel being slidably supported on the ends of said bail, an arm secured to said bail, yielding means interposed between said arm and said main frame and normally urging said bail to hold said reel in its normal operative position, and lifting means on said main frame connected to said reel-supporting frame and actuatable to elevate said reel-supporting frame on said bail independently of said suspension means and to elevate said bail in said slotted brackets.

5. In a side-delivery rake, the combination of a main frame, a reel-supporting frame disposed transversely of said main frame, a reel journaled in bearings on said reel-supporting frame, yielding means suspending said reel-supporting frame from said main frame for vertical movement and for fore and aft swinging movement relative to said main frame during operation of the rake, co-acting means on said frames for limiting the downward movement of said reel-supporting frame on said yielding suspension means, and lifting means on said main frame connected to said reel-supporting frame by at least one flexible member actuatable to elevate said reel into retracted position independent of said suspension means.

6. In a side-delivery rake, the combination of a main frame, a reel-supporting frame disposed transversely of said main frame, a reel journaled in bearings on said reel-supporting frame, yielding means suspending said reel-supporting frame from said main frame for vertical movement and for fore and aft swinging movement relative to said main frame, a rocker shaft mounted on said main frame, a pair of horizontally-disposed arms secured to said shaft, flexible means connecting said arms and said reel-supporting frame, and pressure-actuated means interposed between said frame and said rocker shaft and independently of said suspension means adapted to move said reel into and out of its operative position.

7. In a side-delivery rake, the combination of a main frame, a reel-supporting frame disposed transversely of said main frame, a reel journaled on said reel-supporting frame, yielding means suspending said reel-supporting frame from said main frame, a bail swingably supported on said main frame, saddles formed at the lower ends of said bail, bearings for said reel slidably supported in said bail saddles to form a floating mounting for said reel.

8. In a side-delivery rake, the combination of a main frame, a reel-supporting frame disposed transversely of said main frame, a reel journaled on said reel-supporting frame, yielding means suspending said reel-supporting frame from said main frame, a bail swingably supported on said main frame, saddles formed at the lower ends of said bail, bearings for said reel having slots formed therein to receive said bail saddles to form a floating mounting for said reel.

9. In a side delivery rake, the combination of a main frame, a reel, means for supporting said reel from said main frame, for vertical movement and for fore and aft swinging movement relative to said main frame, said reel including a pair of disk shaped end members, a plurality of tine rods extending between said end members and being rotatably journalled therein, a plurality of tines attached to said tine rods, and a reel supporting shaft attached to said end members and extending outwardly therefrom, a pair of bearings journalled on said shaft, said bearings being connected to a portion of said main frame, means for rotating said shaft and said associated end members, and means for adjusting the pitch of said tine rods with respect to the terrain, including a sprocket gear which is rotatably supported upon one of said bearings and which is rotatable independently of said associated bearing and said shaft, means for positioning said sprocket gear in various positions relative to said main frame portion associated with said bearing, a sprocket attached to each of said tine rods, a plurality of idler sprockets rotatably supported upon said end members intermediate said sprockets associated with said tine rods, a chain operatively connecting said idlers, said sprockets associated with said tine rods, and said adjustable sprocket gear whereby rotation of said reel maintains constant the relation of said tines with respect to said terrain, changes in the rotative position of said sprocket gear relative to said main frame portion thereby being operable to alter the pitch of said tines relative to the terrain.

10. In a side delivery rake, the combination of a main frame, a reel-supporting frame, a reel journalled on said reel-supporting frame, a member connected with the assemblage of said reel-supporting frame and reel and swingably connected with said main frame for guiding said reel and reel-supporting frame for generally fore and aft swinging movement relative to said main frame during operation of the rake, and a plurality of springs, at least one of said springs being connected at one end thereof to each end of said reel-supporting frame, the other end of the springs being connected to said main frame.

11. In a side delivery rake, the combination of a main frame, a reel-supporting frame, a reel journalled on said reel-supporting frame, a member connected with the assemblage of said reel-supporting frame and reel and swingably connected with said main frame for guiding said reel and reel-supporting frame for generally fore and aft swinging movement during operation of the rake, at least one of the connections between said member and said assemblage and said main frame being a lost motion connection which permits relative vertical movement between said reel-supporting frame and said main frame, a plurality of springs, at least one of said springs being connected at one end thereof to each end of said reel-supporting frame, the other end of the springs being connected to said main frame, and a spring connected with said member and said main frame for urging said reel towards its normal operative position.

12. A side delivery rake comprising a main mobile frame, laterally extending bearings mounted on said frame, a bail member having an intermediate portion journalled in said bearings and having depending end portions, a rotary reel rake operatively connected to said end portions, and tension means operatively connected to said bail to resist turning of said bail and to maintain said reel in operative position.

PAUL R. SCHROEPPEL.

References Cited in the file of this patent

UNITED STATES PATENTS

| Number | Name | Date |
|---|---|---|
| 122,487 | Perry | Jan. 2, 1872 |
| 471,648 | Mann | Mar. 29, 1892 |
| 2,255,288 | Jones et al. | Sept. 9, 1941 |
| 2,336,117 | Moschel et al. | Dec. 7, 1943 |
| 2,403,401 | Rietz | July 2, 1946 |